Figure 1:
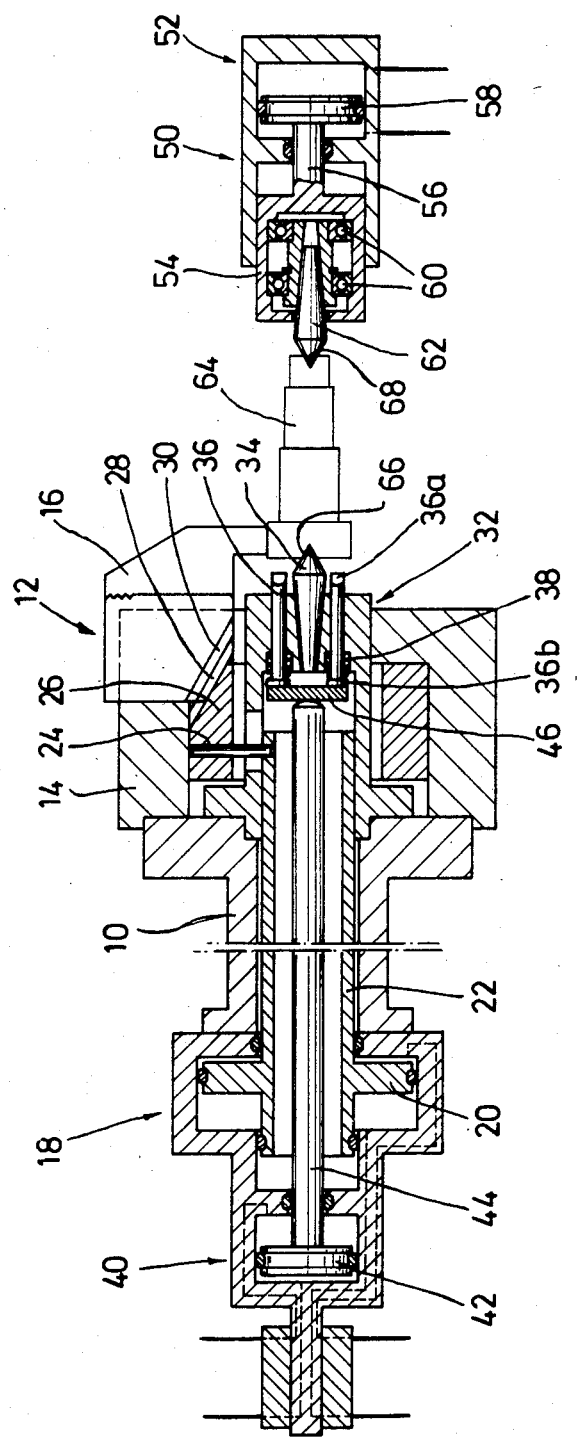

United States Patent [19]

Link et al.

[11] Patent Number: 4,604,923

[45] Date of Patent: Aug. 12, 1986

[54] METHOD OF MACHINING A WORKPIECE BETWEEN CENTERS AND A CLAMPING DEVICE FOR PERFORMING THIS METHOD

[75] Inventors: Helmut F. Link, Aichwald; Erich E. Schäfer, Nabern, both of Fed. Rep. of Germany

[73] Assignee: Index-Werke Komm. Ges. Hahn & Tessky, Esslingen, Fed. Rep. of Germany

[21] Appl. No.: 570,462

[22] Filed: Jan. 13, 1984

[30] Foreign Application Priority Data

Jan. 18, 1983 [DE] Fed. Rep. of Germany ....... 3301438

[51] Int. Cl.⁴ .................... B23B 1/00; B23B 33/00
[52] U.S. Cl. ..................... 82/1 C; 82/40 R; 82/45; 279/1 L
[58] Field of Search ............. 82/1 C, 40 R, 45; 279/1 DA, 1 DC, 1 L

[56] References Cited

U.S. PATENT DOCUMENTS

| | | | |
|---|---|---|---|
| 1,829,619 | 10/1931 | Svenson | 82/40 R |
| 1,914,984 | 6/1933 | Smith et al. | 82/40 R |
| 2,672,780 | 3/1954 | Schurr | 82/40 R |
| 4,482,162 | 11/1984 | Anegawa | 279/1 DC |

FOREIGN PATENT DOCUMENTS

| | | | |
|---|---|---|---|
| 1119629 | 12/1961 | Fed. Rep. of Germany | 82/40 R |
| 627649 | 10/1927 | France | 82/40 R |

*Primary Examiner*—Leonidas Vlachos
*Attorney, Agent, or Firm*—Neuman, Williams, Anderson & Olson

[57] ABSTRACT

A method for rough-turning and finishing a workpiece on a lathe wherein the lathe is provided with a tailstock center which is axially displaceable, a further center on the work spindle as well as axially displaceable front drivers and a chuck so that, for rough-machining, the workpiece is lifted off the work spindle center by means of the front drivers and driven by the chuck whereas, for finish-machining, the workpiece is held between the centers and driven by the front drivers.

11 Claims, 9 Drawing Figures

METHOD OF MACHINING A WORKPIECE BETWEEN CENTERS AND A CLAMPING DEVICE FOR PERFORMING THIS METHOD

The invention relates to a method of machining a workpiece in a lathe between a first center mounted on a work spindle and a second center mounted on a tailstock and displaceable in axial direction, with which the workpiece is inserted between the centers and centered as a result of axial pressure exerted by the two centers, whereupon the workpiece is driven by front drivers, which are mounted on the work spindle, displaceable in axial direction relative to the first center and pressed against one end face of the workpiece, and subjected firstly to rough-machining and then finish-machining by a lathe tool. In addition, the invention relates to a clamping device for performing such a method, comprising a work spindle, on which a first center is mounted together with front drivers displaceable in axial direction, and also comprising a tailstock, on which a second center is mounted for displacement in axial direction.

It is known to insert a driver head into the work spindle of a lathe such a driver head having a stationary center in the middle of its end face and a plurality of drivers arranged in a circle concentric to this center. These drivers are in the form of bolts which may be advanced in an axial direction and pressed against an end face of the workpiece by, for example, hydraulic means. The ends of the bolts facing the workpiece each have a cutting edge for pressing into the workpiece. In the case of a driver head of this type the workpiece is driven by the drivers both for rough-machining and finish-machining; in the case of another known driver head two sets of drivers are provided, which are alternately displaceable, so that one set of drivers is used for rough-turning and one for finishing. Both types of driver head have the disadvantage that, as a result of the high machining forces occurring during rough-turning, the workpiece center in the end face of the workpiece facing the work spindle will be deformed since the driving torque passes into this end face of the workpiece and the machining forces run tangentially to the workpiece. Once the workpiece center is deformed, no great accuracy with regard to concentricity can be achieved for the finish-turning.

In addition, a so-called equalizing chuck is known. This is a chuck which is secured to the work spindle and has a resilient or rigid center in the middle of its end face and clamping jaws on both sides of this center. These clamping jaws enable a workpiece to be clamped at its circumference. In order to function as equalizers the clamping jaws are floatingly mounted and, as a result of the internal friction of the chuck, the mid-point between the clamping positions does not coincide with the axis of the center or the workpiece center. For this reason, the workpiece center in the end face of the workpiece facing the work spindle will still be deformed during rough-machining even when an equalizing chuck is used so that no great accuracy of concentricity may be achieved for the finish-machining. The same applies for a so-called rotating driver which is also arranged in the work spindle and has clamping jaws constructed like two-armed levers, between which the workpiece is clamped at its circumference; the rotating driver also has a certain imbalance which impairs the concentricity of the workpiece.

The clamping device of DE-GM No. 1,985,829 also has the disadvantage that the workpiece center in the end face of the workpiece facing the work spindle is deformed during rough-turning. This device has a fixed center, drivers which are forwardly and axially resilient and clamping jaws of a chuck which are held for radial displacement and are arranged around the forward end area of the center. Each of these clamping jaws is connected to a separate hydraulic piston for individual adjustment in a radial direction and all of them are held on a common annular chuck body which is displaceable in axial direction. In the case of this known clamping device the center and drivers are constantly engaged on the workpiece throughout the entire machining process. The chuck can, however, be axially withdrawn to behind the drivers once the clamping jaws have been withdrawn so that the workpiece may be machined over its entire length during finishing.

The object underlying the invention was therefore to develop a method which allows workpieces which are to be machined between centers in a lathe to be finish-machined with a higher degree of accuracy with regard to concentricity. Proceeding on the basis of a method of the type described at the beginning this object is accomplished according to the invention in that the workpiece, after it has been centered between the centers, is lifted off the center associated with the work spindle by the front drivers, while the second center yields in axial direction, and then clamped at its circumference by a chuck mounted on the work spindle whereupon the workpiece is subjected to rough-machining, and in that the workpiece is then released from the chuck and again clamped between the two centers and driven by the front drivers pressed against one end face of the workpiece whereupon the workpiece is finish-machined.

With the inventive method, the workpiece center on the side of the workpiece, into which the torque passes, is not stressed at all during rough-turning and therefore the highest degree of accuracy is guaranteed for concentricity during finishing. In order to carry out the inventive method a clamping device of the type described at the beginning is particularly suitable. In addition to the front drivers the work spindle of this device is provided with a chuck, namely a so-called hollow chuck, the clamping jaws of which encircle the center and front drivers. In the case of the inventive method, the workpiece center on the side facing the work spindle will not only be spared deformation during rough-turning but the end of the workpiece facing the work spindle will also not be damaged by marked indents caused by the front drivers and thus the latter will engage during finishing on a surface which is not yet deformed. As a result of the invention the operating procedures of rough-machining and finishing can be carried out in one setting and with the highest accuracy of concentricity during finishing.

The workpiece may, of course, be lifted off the center associated with the work spindle by means other than the front drivers before the workpiece is clamped at its circumference ready for rough-turning. If, for example, clamping jaws are provided which are inclined at an angle to the work spindle axis the workpiece may also be lifted off the center associated with the work spindle by these jaws while it is clamped in the chuck. For this purpose, it is sufficient for the movement of the clamping jaws to comprise an axial component during grasping and clamping of the workpiece, i.e. that it is axially carried along by friction. However, a construction is preferred, with which the clamping jaws have a workpiece stop for one end face of the workpiece on their radially inward ends, these stops acting in an axial direction.

Since no torque will pass into the tailstock side of the workpiece there is no danger that the center of the workpiece will be deformed; it is therefore recommended that the second center, i.e. that associated with the tailstock, be pressed with considerable force against the workpiece during rough-turning.

Figure 2:
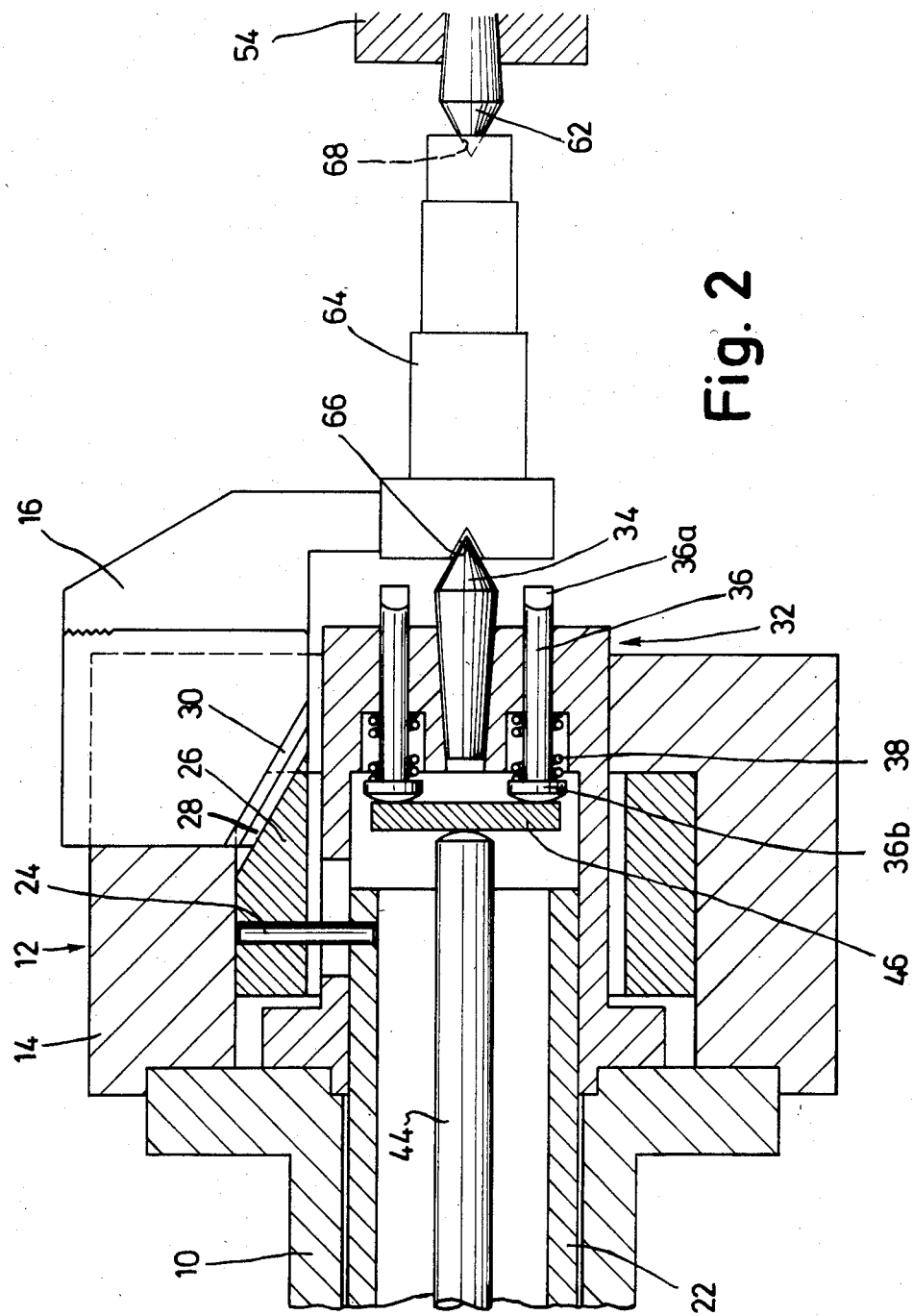
Figure 7:
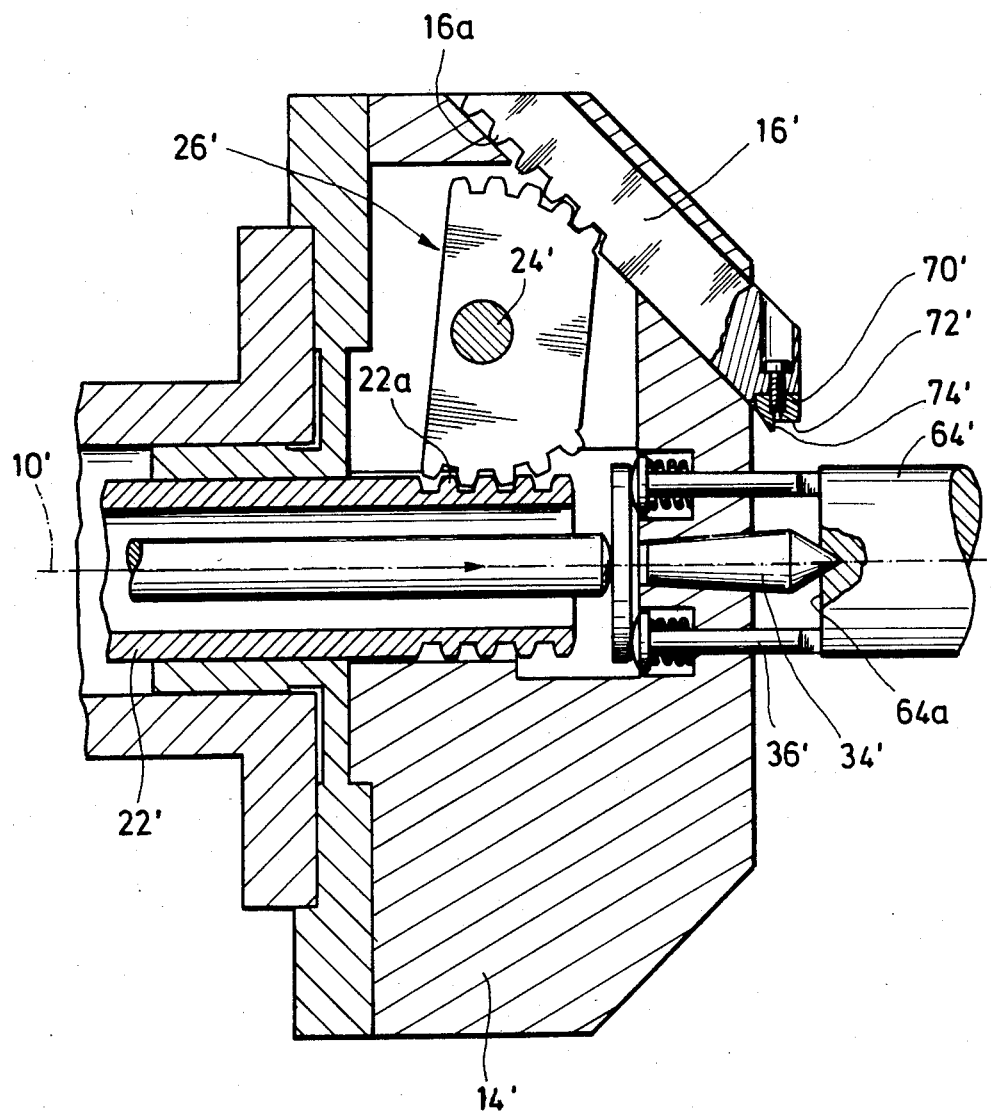
Figures 8, 9:
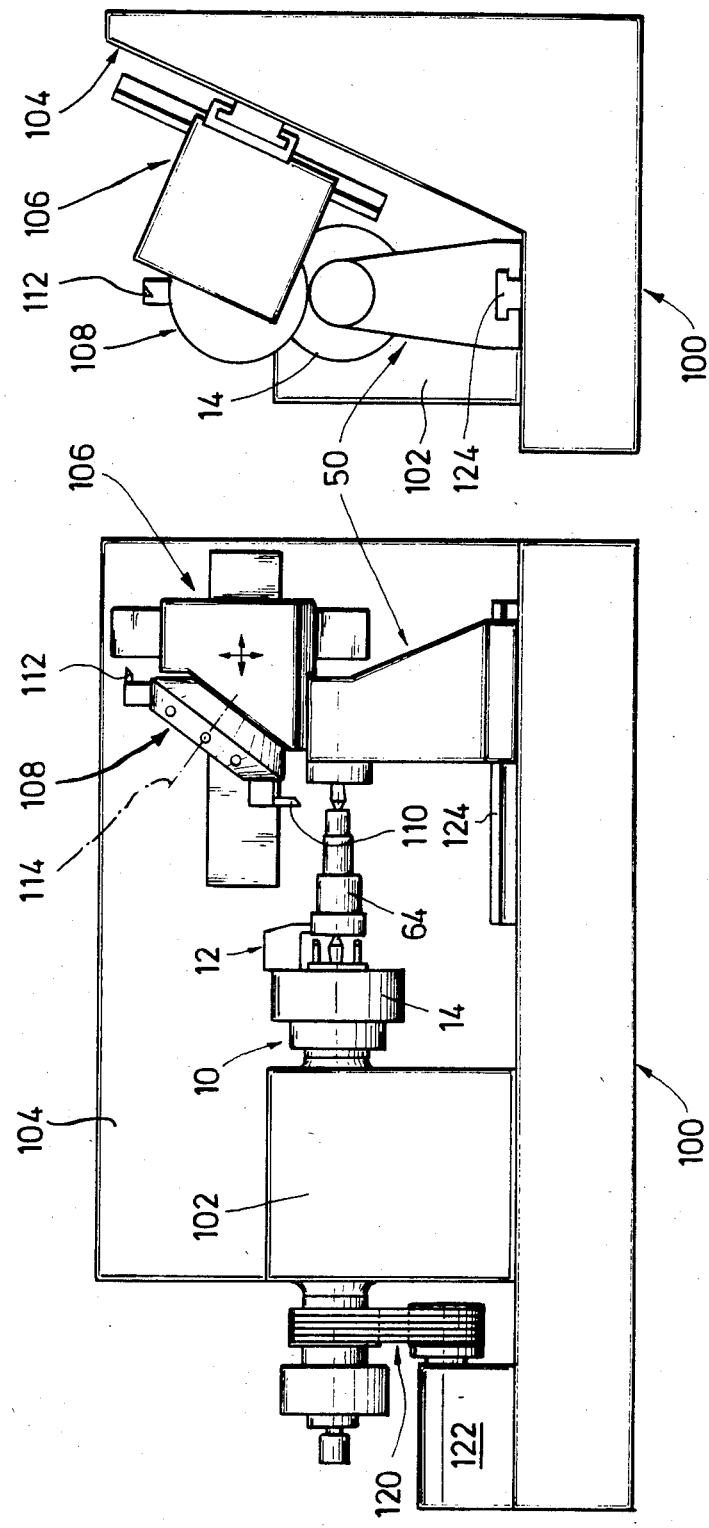

Additional features, advantages and details of the invention are shown in the attached drawings of two preferred embodiments of the inventive clamping device as well as in the following description of these embodiments and the operation of the inventive method in its most adavantageous form; the drawings show:

FIG. 1—an axial section through the work spindle and the tailstock of a first embodiment;

FIG. 2—a detail from FIG. 1 on a larger scale;

FIGS. 3 to 6—the various stages of the inventive method of operation;

FIG. 7—a section through the second embodiment of the inventive clamping device corresponding to the left-hand part of FIG. 2;

FIG. 8—a front view of a lathe with an inventive clamping device and

FIG. 9—a view of the lathe, seen in the direction of arrow "A" in FIG. 8.

FIG. 1 shows a work spindle 10 of a customary lathe provided at the front with a chuck designated as a whole as 12. The latter has a housing 14, in which, for example, three clamping jaws 16 disposed on the end face of the housing are guided in the usual way for displacement in a radial direction. FIG. 1 shows only one of these three clamping jaws since the other two are each offset from the clamping jaw 16 shown through 120° relative to the work spindle axis and are not therefore visible in FIG. 1. The chuck 12 is actuated by means of a double-acting hydraulic cylinder 18 flanged to the work spindle 10 and having a piston 20 and a piston-rod tube 22 which is connected by pins 24 to a conical ring 26 which is guided in the chuck housing 14 for axial displacement and serves to actuate the clamping jaws 16. For this purpose, the conical ring has a plurality of T-shaped grooves on its inclined face. Each clamping jaw 16 has a bar 30 with a corresponding T-shaped profile mounted on it for engagement in a T-shaped groove. When the conical ring 26 is displaced in an axial direction all the clamping jaws 16 are moved inwards or outwards in synchronism and automatically in a radial direction so that they are always concentric to the axis of the work spindle 10.

A driver head 32 is mounted on the forward end of the work spindle 10. This driver head bears a fixed, first center 34 such that its axis coincides with that of the work spindle 10. In addition, three bolt-shaped front drivers 36 are, for example, guided in the driver head 32 for axial displacement, these drivers each being provided at their forward ends with a cutting edge 36a and at their rearward ends with a head 36b so that they are withdrawn by return springs 38 to behind the forward area of the center 34 when they are not in operation. The front drivers 36 are actuated by a second double-acting hydraulic cylinder 40 with piston 42 and piston rod 44, the latter pushing the front drivers 36 forwards via a pressure plate 46.

A tailstock designated as a whole as 50 forms, with its rearward part, a third double-acting hydraulic cylinder 52 and, with its forward part, an axial guide for a bearing housing 54 which is secured to the piston rod 56 of piston 58 of the hydraulic cylinder 52. The housing accommodates bearings 60, in which a second center 62 is rotatably mounted.

When a workpiece 64 with its centers 66 and 68 is arranged on the centers 34 and 62 these two centers may be pressed against the workpiece by means of the hydraulic cylinder 52.

Figure 3:
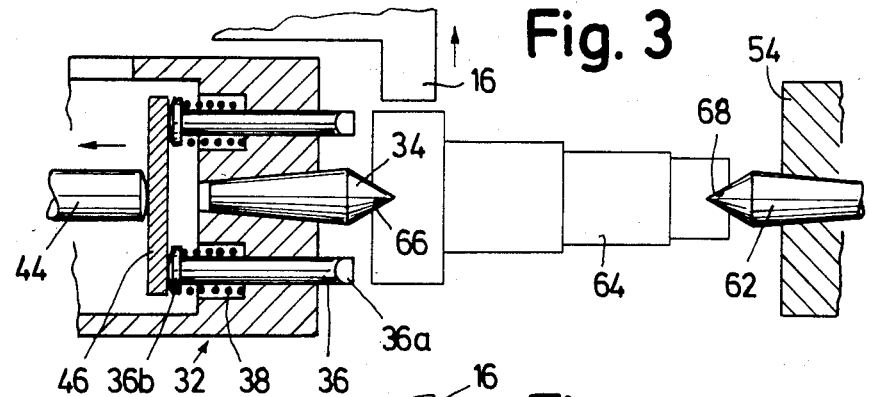
Figure 4:
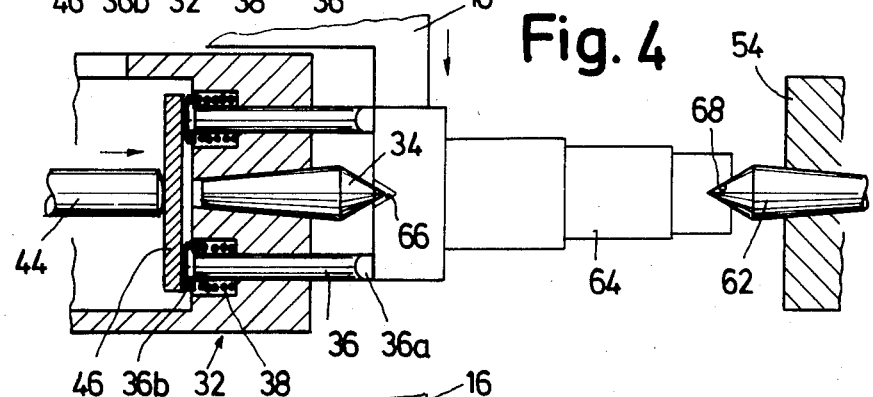

The inventive method will now be explained in more detail on the basis of FIGS. 3 to 6:

First of all, the workpiece 64 to be machined is inserted between the centers 34 and 62 and centered as a result of the second center being moved forward (FIG. 3). The second center 62 is then made pressureless or engages with only minimal pressure on the workpiece so that the workpiece may be lifted off the first center 34 by forward displacement of the front drivers 36 (vide FIG. 4).

Figure 5:
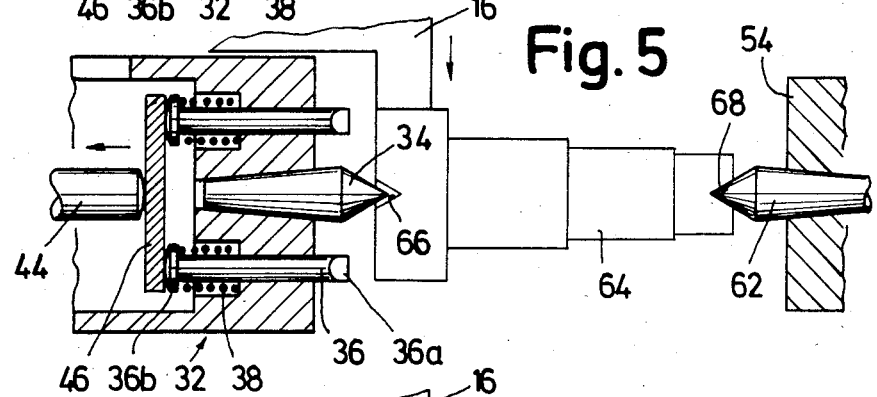
Figure 6:
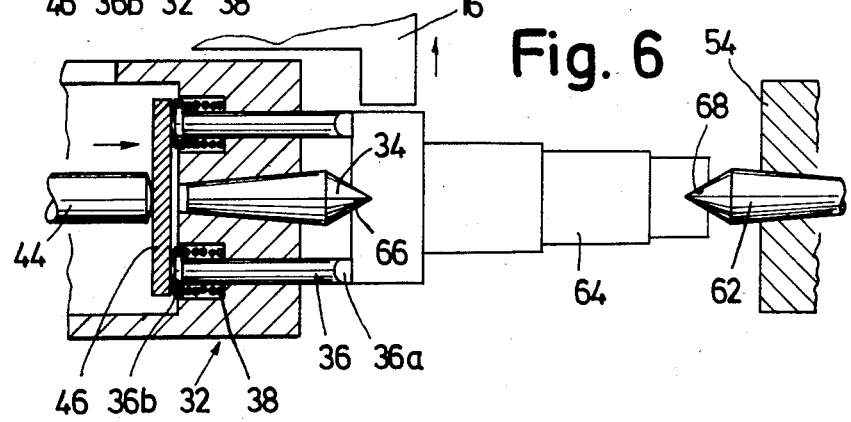

The workpiece may now be clamped at its circumference between the clamping jaws 16 (vide FIG. 4) whereupon the front drivers 36 will be relieved of pressure and withdrawn from the workpiece (vide FIG. 5). The workpiece will then be rough-turned without any risk of the workpiece center on the side of the workpiece, into which the drive torque will pass, being deformed by a lathe center. It is recommended that the second center 62 be pressed with considerable force against the workpiece during rough-turning.

Once rough-turning has been completed it is appropriate to proceed in such a way that the contact pressure of the second center 62 is first reduced and then the chuck 12 opened so that the workpiece can again be pressed with slight pressure against the first center 34. Subsequently, the front drivers 36 are pressed against the left-hand end face of the workpiece so that, when the work spindle is driven, the workpiece is also driven by the front drivers (vide FIG. 6). The pressure force of the front drivers 36 must thereby be less than the axial force of the second center 62. Finish-machining will take place during this phase, whereupon the front drivers are withdrawn, the finished workpiece is grasped by a gripping device which is not illustrated and, finally, the center 62 associated with the tailstock is withdrawn so that the workpiece can be removed from the lathe.

FIG. 7 illustrates the work spindle side of a second embodiment of the inventive clamping device. This will be described in the following only insofar as it differs from the embodiment shown in FIG. 2.

This second embodiment has clamping jaws 16' which are displaceably guided in a chuck housing 14' at an acute angle and preferably at an angle of 45° to the work spindle axis 10'. Each of the clamping jaws and a piston rod 22', which corresponds to the piston rod 22 of the first embodiment, have a tooth construction 16a or 22a. In addition, a toothed wheel segment 26' is provided for each clamping jaw 16' and rotatably mounted in the chuck housing 14' about an axis 24'. The toothed wheel segment meshes with the teeth 16a of the associated clamping jaw 16' and the teeth 22a of the piston rod 22' so that, upon displacement of the piston rod, the clamping jaws 16' can all be moved forwards and backwards in synchronism and with their radial inner ends always concentric to the work spindle axis 10'. Screwed onto the radially inner end of each clamping jaw 16' is a jaw 70' with a clamping face 72' and a shoulder 74', the latter engaging between the front drivers 36' on the end face 64a of a workpiece 64' when the workpiece is held between the clamping jaws 16'. Since the clamping movement of the clamping jaws 16' has an axial component acting in the direction away from the chuck housing 14' and in the same direction as the work spindle axis 10' the workpiece 64' may be lifted off the center 34' and the front drivers 36' when it is held between the clamping jaws 16' for rough-turning and driven by these jaws.

As FIGS. 8 and 9 are merely intended to illustrate the arrangement of an inventive clamping device on a lathe, a cursory description of these two Figures will suffice. They show a machine frame 100 with a headstock 102 and a so-called angle bed 104 for a cross-slide system 106 which supports a tool turret 108. Inserted in this turret are, for example, a rough-turning tool 110 and a finishing tool 112 for finish-turning the workpiece 64; the finishing tool may be moved into its operating position by rotating the tool turret 108 about the turret axis 114. The work spindle 10 rotatably mounted in the headstock 102 is driven by a motor 122 via a belt drive 120 and the tailstock 50 is displaceable along a guideway 124, which is attached to the machine frame 100, in the direction of the work spindle axis.

What is claimed is:

1. A method for machining a workpiece mounted in a lathe between a rotatable work spindle rotatable about an axis of rotation and having a chuck, front drivers and first center at one workpiece end and an axially movable second center mounted on a tailstock and urged in the direction of said first center at a second workpiece end, the second center being disposed substantially in alignment with the work spindle axis of rotation, comprising the steps of inserting a workpiece between the first and second centers; centering and supporting the workpiece between said centers; applying force to the workpiece end engaging the first center and removing the centered workpiece from engagement with said first center in the direction of said second center; supporting said workpiece between the point of force application and said second center; urging said second center to move substantially along said work spindle axis of rotation away from said first center; clampingly supporting the workpiece about peripheral portions thereof by means of said chuck; rotating the workpiece while so clamped to said chuck by rotatably driving said chuck; rough-machining the rotating workpiece; releasing the workpiece from the chuck while supporting the workpiece between said first and second centers; urging said front drivers against the end of the workpiece engaging the first center; rotating said workpiece by means of said front drivers while said workpiece is supported between said centers, and finish-machining the rotating workpiece.

2. The method of claim 1, in which said chuck has clamping jaws which are positively actuated in synchronism, and concentrically arranged relative to the work spindle axis.

3. The method of claim 1 in which the workpiece is removed from engagement with the first center by the front drivers which apply an axial force to the workpiece end engaging the first center before being clamped by the chuck.

4. The method of claim 1 in which said chuck has clamping jaws and the workpiece is removed from engagement with the first center during clamping by said clamping jaws of the chuck which are displaceable at an angle to the work spindle axis, and apply an axial force to the workpiece end engaging the first center while being clamped by the chuck.

5. The method of claim 1 in which the second center is pressed against the workpiece during the rough-machining step.

6. The method of claim 1 in which the front drivers are retracted from engagement with the workpiece during rough-machining.

7. A workpiece clamping apparatus for use in a lathe, comprising a work spindle rotatably driven about an axis of rotation; bearing means rotatably mounting said work spindle; a first workpiece center supportably mounted on an end portion of said work spindle; retractable front driver means supportably mounted on the spindle end portion; a tailstock spaced axially from said work spindle end portion; means for urging said front driver means into a retracted position wherein the distal ends of said front driver means are inwardly disposed of the distal end of the first workpiece center; an axially movable second workpiece center rotatably mounted on said tailstock; means for urging said second center toward said first center whereby a workpiece may be centered and supported between said first and second workpiece centers; a chuck mounted on said work spindle and having clamping jaws for clampingly engaging a workpiece after said workpiece is centered, and cooperative action with said second center in maintaining a clampingly engaged workpiece in substantial alignment with said axis of rotation; means for moving said clamping jaws in synchronism and concentrically to said axis of rotation into workpiece-engaging and workpiece-release conditions; said chuck clamping jaws moving at an angle to the work spindle axis of rotation when moving into engagement with a workpiece and being so located relative to said first workpiece center as to impart axial movement to a workpiece centered between said first and second workpiece centers whereby a workpiece is simultaneously driven from engagement with said first workpiece center, axially moved in opposition to the second center substantially along the workpiece axis of rotation and clamped into a position substantially coaxial with the workpiece axis of rotation; and means for extending said front driver means from the retracted position into engagement with the end of a workpiece when said workpiece is engaged by said first and second centers.

8. The clamping apparatus of claim 7 in which the first center and the front driver means are arranged in the interior of the chuck.

9. The clamping apparatus of claim 7 in which the first center is connected to the work spindle so as to be immovable in an axial direction relative thereto.

10. The clamping apparatus of claim 7 in which the chuck clamping jaws have radial inner ends displaceably guided at such an angle to the work spindle axis of rotation when said jaws assume a workpiece engaging condition whereby the clamping movement of the radial inner ends includes an axial component of movement in the direction in which the front driver means are extended, said clamping jaw radial inner ends being axially retractable when assuming a workpiece release condition to a location inwardly disposed of the distal end of the first center and of the outermost position of the distal ends of the front driver means.

11. The clamping apparatus of claim 10 in which the clamping jaws have on their radial inner ends workpiece stops for locating one end face of a workpiece; said stops locating a workpiece in a predetermined axial position in substantial alignment with said axis of rotation when said clamping jaws clampingly engage a workpiece.

* * * * *